Figure 1:
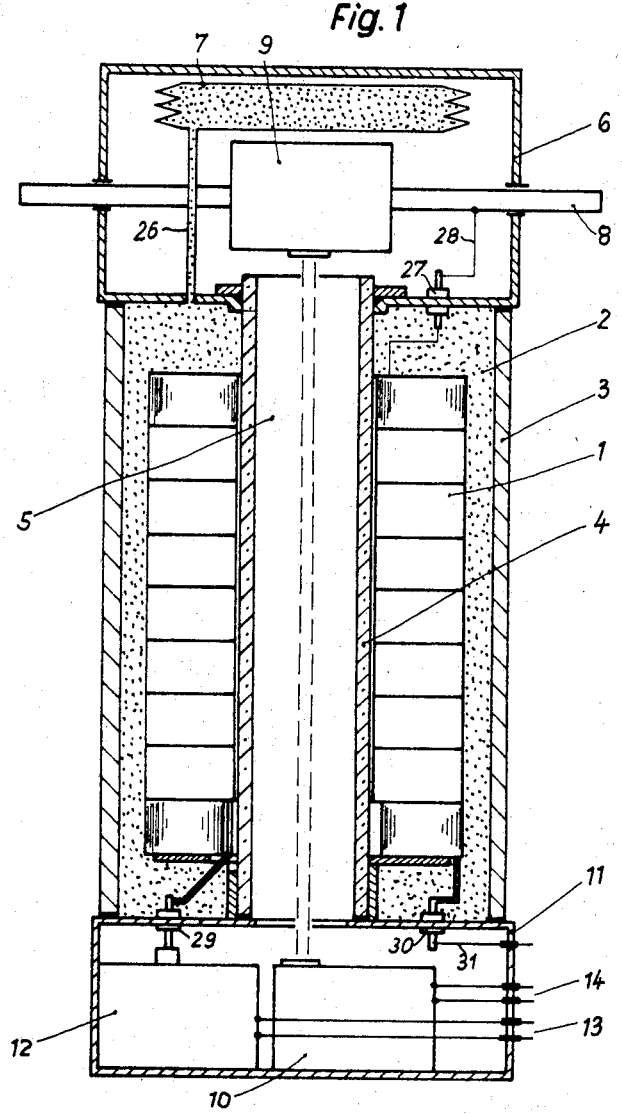

United States Patent Office 3,411,069
Patented Nov. 12, 1968

3,411,069
CAPACITIVE VOLTAGE TRANSFORMER AND CURRENT TRANSFORMER COMBINATION UNIT
Alfred Kubler, Karlsruhe-Durlach, Hans Jahn, Karlsruhe, and Helmut Pilz, Berlin, Germany, assignors to Siemens Aktiengesellschaft, Munich, Germany, a corporation of Germany
Filed July 1, 1966, Ser. No. 562,210
Claims priority, application Germany, July 8, 1965, S 98,086
9 Claims. (Cl. 323—44)

The present invention relates to a capacitive voltage transformer and current transformer combination unit. More particularly, the invention relates to a single combination structural unit comprising a capacitive voltage transformer having a capacitive voltage divider, an inductive portion and a ((inductive) current transformer.

The current in the high voltage power lines on the high voltage side of an inductive current transformer is preferably measured rather than the current on the low voltage side, due to the considerable insulation requirements of an inductive current transformer. The measured current is then transmitted by wireless transmission from the high voltage side to the low voltage side, where it is indicated.

The principal object of the present invention is to provide a new and improved capacitive voltage transformer and current transformer combination unit. The capacitive voltage transformer and current transformer combination unit of the present invention is a single combination structural unit.

In accordance with the present invention, a single structural unit for an electrical power line comprises a current transformer and a capacitive voltage transformer. The structural unit comprises a first substantially tubular electrically insulating member. A second substantially tubular electrically insulating member is preferably coaxially positioned inside the first insulating member and radially spaced therefrom. A first housing portion is fluid tightly affixed to one end of the first and second insulating members. A second housing portion is fluid tightly affixed to the opposite end of the first and second insulating members. The first and second insulating members and the first and second housing portions form a sealed-off substantially preferably annular area between the first and second insulating members. Electrical and heat insulation material is provided in this area. A current transformer transmitter is positioned in the first housing portion and connected to the power line for deriving an indication of the current in the power line and transmitting the indication via wireless transmission through the second insulating member. A current transformer receiver is positioned in the second housing portion for receiving the indication via the wireless transmission and provides an output in accordance with the indication. A capacitive voltage transformer has a capacitive voltage divider which is positioned in the area between the first and second insulating members and comprises an input terminal, an input for applying a voltage from the power line to the input terminal, an output terminal and an output for deriving a voltage from the output terminal.

The input of the capacitive voltage transformer is positioned in the first housing portion and the output is positioned in the second housing portion. The structural unit further comprises an expansion chamber positioned in the first housing portion and a duct connecting the expansion chamber to the area between the first and second insulating members. The capacitive voltage divider of the capacitive voltage transformer further comprises a plurality of annular coil capacitors coaxially positioned around the second insulating member and adjacent each other in axial direction.

In one embodiment of the snigle structural unit of the present invention, the input of the capacitive voltage transformer comprises an electrical conductor connected between the power line and the input terminal. In a modification of such embodiment, the single structural unit further comprises a coupling transformer having an input winding and an output winding coupled to the current transformer transmitter. The input of the capacitive voltage transformer then comprises the input winding of the coupling transformer and an electrical conductor connecting the power line to the input terminal via the input winding.

Figure 2:
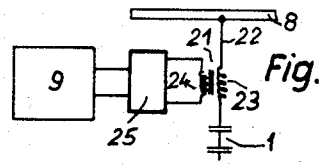

In order that the present invention may be readily carried into effect, it will now be described with reference to the accompanying drawing, wherein:

FIG. 1 is a view, partly in section, of an embodiment of the single combination structural unit of the present invention; and FIG. 2 is a view of a modification of part of the combination structural unit of FIG. 1.

In FIG. 1, the single combination structural unit comprises an input or high voltage or current transformer transmitter part 9 electrically connected by any suitable means to a power line 8. In the embodiment of FIG. 1, the transmitter part 9 is directly connected to the power line 8. In the modification of FIG. 2, the transmitter part 9 is inductively coupled to a line connected between the capacitive voltage transformer, hereinafter described, and the power line 8. Thus, in FIG. 2, a coupling transformer 21 couples the transmitter part 9 to the line 22 connected between the capacitive voltage transformer and the power line 8. The coupling transformer 21 has an input winding 23 connected in the line 22 and an output winding 24 connected to the transmitter part 9 via a voltage stabilizer 25. The voltage applied to the transmitter part 9 is thus a stabilized voltage derived from the current of the capacitive voltage divider.

In FIG. 1, the single combination structural unit comprises a current transformer receiver part 10, spaced from the transmitter part 9. The transmitter part 9 is suitably mounted in a first housing portion 6 and the receiver part 10 is suitably mounted in a second housing portion 11 spaced from the first housing portion. The first housing portion 6 and the second housing portion 11 are spaced from each other by radially spaced coaxial first and second insulator members or tubes 3 and 4. The first housing portion 6 is mounted on the insulator members 3 and 4 at one end of said members and the second housing portion 11 is mounted on said members at the opposite end of said members.

Each of the insulator members 3 and 4 comprises electrically insulating material of any suitable type such as, for example, ceramic material. The insulator members 3 and 4 being coaxially positioned with the member 4 positioned inside the member 3 and radially spaced therefrom, form an annular area or gap between them. The first housing portion 6 is affixed to the members 3 and 4 with a fluid tight seal at the annular area and the second housing portion 11 is affixed to said members with a fluid tight seal at said annular area, so that said annular area is sealed off.

An expansion chamber or reservoir 7 is positioned in the first housing portion 6 and is coupled to the annular area between the insulator members 3 and 4 by a conduit or tube 26. The annular area between the insulator members 3 and 4 is filled with insulation material 2. The insulation material 2 is electrical and heat insulation material of any suitable type and may include for example, a gas or a liquid. The insulation material 2 may expand into the expansion chamber 7 as the temperature of the unit increases.

The power line 8 passes through the first housing portion 6. The current transformer transmitter part 9 transmits a measurement or indication of the current in the input line 8 to the receiver part 10 via a wireless transmission through the inside of the second insulator member 4. The inside of the second insulator member 4 is kept free of insulation. The wireless transmission from the transmitter part 9 to the receiver part 10 of the current transformer may be by any suitable means such as by infrared light, for example. The output of the receiver part 10 is provided in leads 14, which are passed through the second housing portion 11, so that the measured or transformed current is available outside said housing portion.

In accordance with the present invention, a capacitive voltage transformer, or, more particularly, the capacitive voltage divider 1 thereof is combined in a single combination structural unit with the current transformer. The annular area, space or gap between the first and second insulator members 3 and 4 is utilized to house the capacitive voltage divider 1. The capacitive voltage divider 1 comprises a plurality of substantially annular coil capacitors coaxially positioned around the second insulator member 4. The annular coil capacitors of the capacitive voltage divider 1 are positioned adjacent each other in axial direction. The capacitive voltage divider 1 may comprise a plurality of flat or ribbon coil capacitors or a single or a few annular or flat coil capacitors.

The capacitive voltage divider 1 has an input terminal 27 connected to the input line 8 via a line 28, and output terminals 29 and 30. The output terminal 30 is connected to a lead 31 in the second housing portion 11. The lead 31 is passed through the second housing portion 11 so that a divided voltage is available outside said housing portion. The capacitive voltage transformer includes an inductive portion 12, which is positioned in the second housing portion 11 and is electrically connected to the output terminal 29. The output of the inductive portion 12 is provided in leads 13, which are passed through the second housing portion 11, so that the measured or transformed induced voltage is available outside said housing portion.

When the measured or derived current is transmitted from the transmitter part 9 to the receiver part 10 via high frequency wireless transmission, rather than infrared light transmission, the capacitors of the capacitive voltage divider 1 are of determined dimensions for assisting such wireless transmission. The capacitors around the second insulating member 4 are thus of dimensions which assist the wireless transmission in the manner of a waveguide.

While the invention has been described by means of a specific example and in a specific embodiment, we do not wish to be limited thereto, for obvious modifications will occur to those skilled in the art without departing from the spirit and scope of the invention.

We claim:

1. A single structural unit for an electrical power line, comprising a first substantially tubular electrically insulating member, a second substantially tubular electrically insulating member positioned inside said first insulating member and radially spaces therefrom, a first housing portion fluid tightly affixed to one end of said first and second insulating members, a second housing portion fluid tightly affixed to the opposite end of said first and second insulating members, said first and second insulating members and said first and second housing portions forming a sealed off area between said first and second insulating members, electrical and heat insulation material in said area, current transformer transmission means positioned in said first housing portion and connected to said power line for deriving an indication of the current in said power line and transmitting said indication via wireless transmission through said second insulating member, and current transformer receiver means positioned in said second housing portion for receiving said indication via said wireless transmission and providing an output in accordance with said indication; and a capacitive voltage transformer having a capacitive voltage divider positioned in the area between said first and second insulating members, said capacitive voltage divider comprising an input terminal, input means for applying a voltage from said power line to the input terminal of said capacitive voltage divider, an output terminal, and output means for deriving a voltage from said output terminal.

2. A single structural unit as claimed in claim 1, wherein said input means of said capacitive voltage divider is positioned in said first housing portion and said output means of said capacitive voltage divider is positioned in said second housing portion.

3. A single structural unit as claimed in claim 1, further comprising an expansion chamber positioned in said first housing portion and duct means connecting said expansion chamber to the area between said first and second insulating members.

4. A single structural unit as claimed in claim 1, wherein the capacitive voltage divider of said capacitive voltage transformer further comprises a plurality of annular coil capacitors coaxially positioned around said second insulating member and adjacent each other in axial direction.

5. A single structural unit as claimed in claim 1, wherein the capacitive voltage divider of said capacitive voltage transformer further comprises a plurality of ribbon coil capacitors coaxially positioned around said second insulating member and adjacent each other in axial direction.

6. A single structural unit as claimed in claim 1, wherein the capacitive voltage divider of said capacitive voltage transformer further comprises a plurality of annular coil capacitors of determined dimensions for assisting wireless transmission from said current transformer transmission means to said current tansformer receiver means.

7. A single structural unit as claimed in claim 1, wherein the input means of said capacitive voltage transformer comprises an electrical conductor connected between said power line and said input terminal.

8. A single structural unit as claimed in claim 1, further comprising coupling transformer means having an input winding and an output winding coupled to said current transformer transmission means, and the input means of said capacitive voltage transformer comprises the input winding of said coupling transformer means and an electrical conductor connecting said power line and said input terminal via said input winding.

9. A single structural unit as claimed in claim 1, further comprising an expansion chamber positioned in said first housing portion and duct means connecting said expansion chamber to the area between said first and second insulating members, and wherein said input means of said capacitive voltage divider is positioned in said first housing portion and said output means of said capacitive voltage divider is positioned in said second housing portion, and said capacitive voltage divider comprises a plurality of annular coil capacitors coaxially positioned around said second insulating member and adjacent each other in axial direction.

References Cited

UNITED STATES PATENTS

| | | |
|---|---|---|
| 1,868,962 | 7/1932 | Atkinson _____ 174—73 |
| 2,081,839 | 5/1937 | Rankin _____ 324—96 |
| 2,668,274 | 2/1954 | Schneider _____ 317—157.62 X |
| 3,005,868 | 10/1961 | Linderholm _____ 174—73 |
| 3,363,174 | 1/1968 | Hudsen et al. _____ 324—96 |

FOREIGN PATENTS 640,335  1936  Germany.

LEE T. HIX, *Primary Examiner.*

G. GOLDBERG, *Assistant Examiner.*